United States Patent [19]
Block et al.

[11] 3,786,925
[45] Jan. 22, 1974

[54] MEANS FOR SEALING MEMBRANE CARRYING TUBES

[75] Inventors: Leo Block, Woodland Hills; Frank R. Shippey, Thousand Oaks, both of Calif.

[73] Assignee: Raypak, Inc., Westlake Village, Calif.

[22] Filed: Feb. 14, 1972

[21] Appl. No.: 225,945

[52] U.S. Cl. ............................... 210/321, 210/433
[51] Int. Cl. .............................................. B01d 31/00
[58] Field of Search ............ 210/321, 433, 497, 323

[56] References Cited
UNITED STATES PATENTS
3,494,470   2/1970   Banfield .............................. 210/321
3,406,831   10/1968  Bush et al. ...................... 210/497 X
3,695,446   10/1972  Lyall et al. ...................... 210/433 X

*Primary Examiner*—Frank A. Spear, Jr.
*Attorney, Agent, or Firm*—Albert M. Herzig et al.

[57] ABSTRACT

An osmotic membrane bridges over the joint between an end core fitting and the end of a tubular porous core member and alloys with the material of the core fitting. The joints may be between modules joined or coupled by male and female plastic core fittings linked together by bayonet joints. This assembly is adapted to use in reverse osmosis machines with the joined modules in a tubular shell forming an annulus with concentrate in the annulus under pressure. The bayonet joints prevent pulling apart of the modules.

6 Claims, 8 Drawing Figures

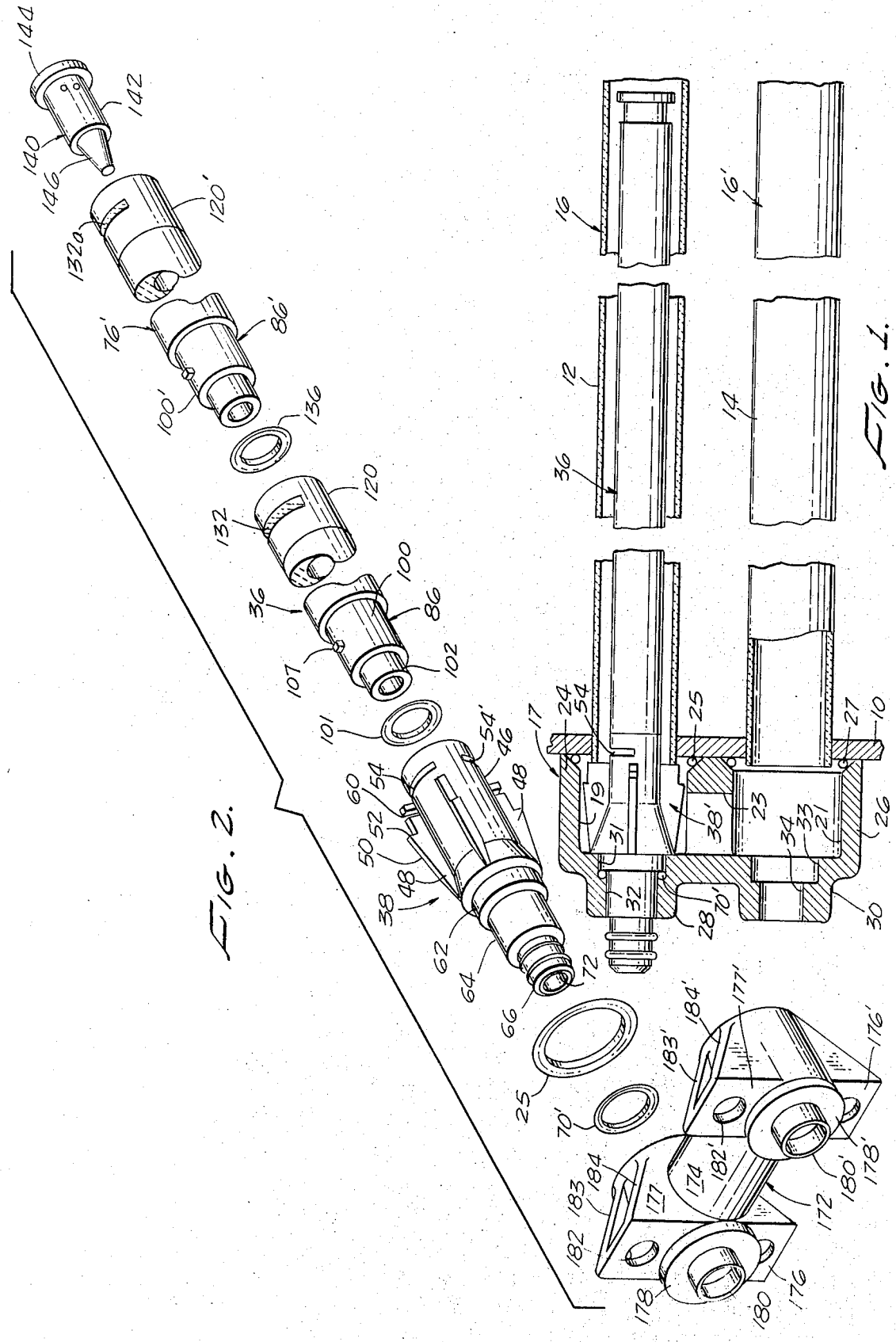

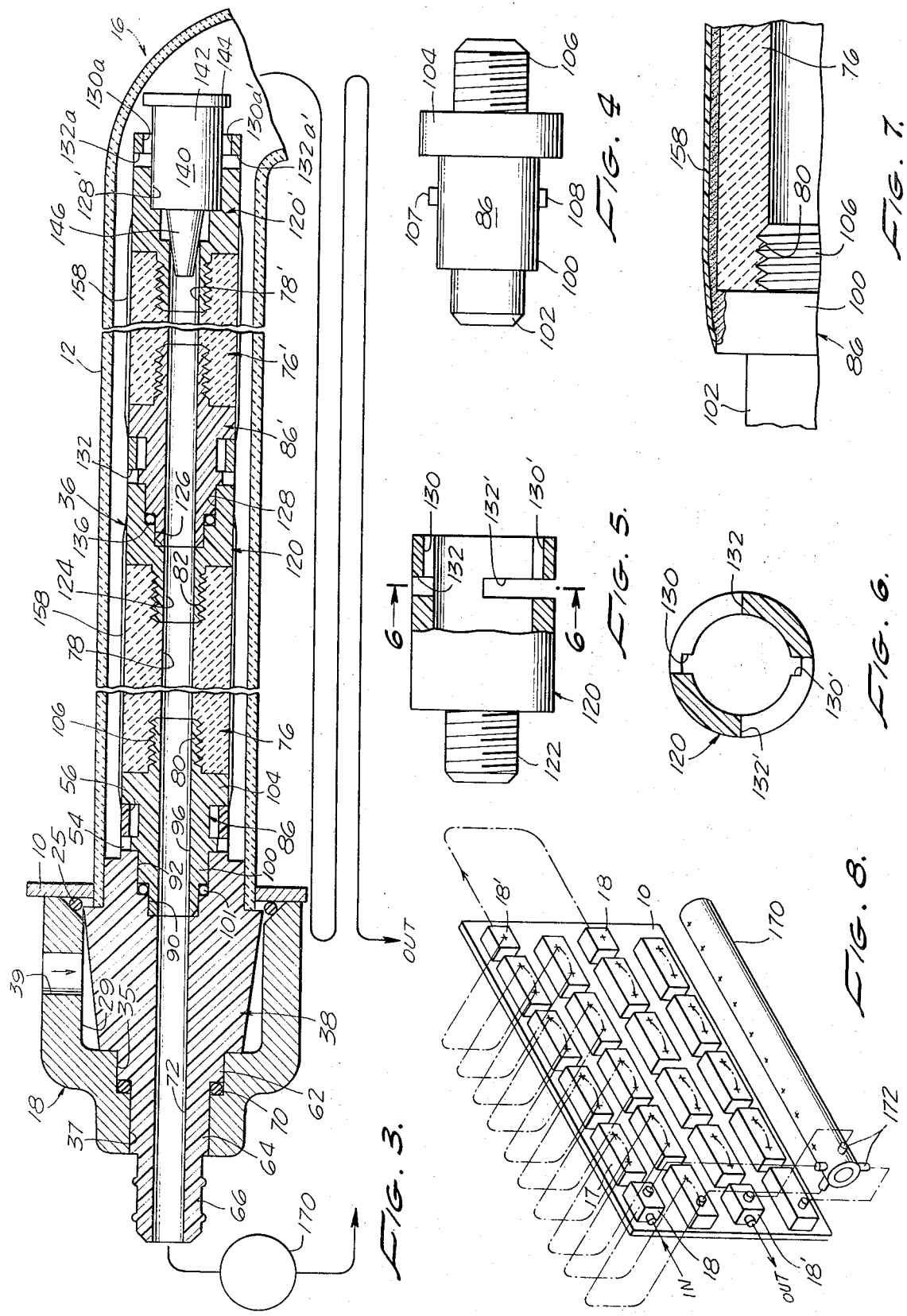

3,786,925

MEANS FOR SEALING MEMBRANE CARRYING TUBES

SUMMARY OF THE INVENTION

The invention relates primarily to sealing the ends of tubular members having a membrane on the surface thereof. The invention is adaptable in many applications and environments. It has particular adaptability in desalination cells of reverse osmosis machines, and the preferred form of the invention described herein is directed to adaptation in such a cell. The invention is adapted in sealing where other fluids are involved such as in food processes, etc. The cell might be called a reverse osmosis cell adapted to be used with other fluids.

The invention in the preferred embodiment illustrated in the drawings relates to desalination cells adapted particularly for the desalination or purification of water by means of an osmotic membrane element. The illustrative embodiment of the invention is an improvement in the type of cell shown more particularly in U.S. Pat. No. 3,400,825. This type of cell embodies an elongated cyclindrical core made of porous material which is positioned within a cylindrical housing providing an annular space between the core and the housing. The osmotic membrane is on the outside of the core member. The permeate finds its way through the membrane and the core to the bore within the core member, the concentrate being in the annular space between the core and the housing. This is a very advantageous type of construction of a desalination cell, but in the industrial adaptation, fabrication, and utilization of such cells, difficult problems have been encountered, solutions of which constitute objects of the herein invention.

One of the problems is the provision of an effective seal at the end of the porous core member. The herein invention provides means in the form of core fittings joined to the ends of the porous core member with the osmotic membrane bridging the joint between the core member and the core fitting and alloyed with the core fitting to positively seal. The realization of a seal by this means is an object of the invention.

In commercial reverse osmosis machines, it is desirable to utilize a large number of desalination cells in a compact assembly. In a preferred configuration, individual cells are positioned in straight lengths of tubing or in tube sections which form part of a continuous, serpentine channel, there being a continuous flow of feed while the permeate is taken off from the cells by way of a manifold. Preferably, the cells are of modular construction comprising modules of predetermined lengths with male and female end core fittings threaded to the core material. The modules are joined by way of bayonet joints between the male and female core fittings. The core fitting at the end of a cell is closed by way of a sealing plug. The membrane at the ends of the cell modules seals as described in the foregoing. This construction provides an axially strong and rigid cell. The pressure of the water to be purified in the annular space may run as high as 1,500 p.s.i. The pressure of the permeate within the cores may run as high as 40 to 50 p.s.i., depending on the head to which the interiors may be connected. When the pressure of the water to be purified is shut off, the pressure within the cell is greater than that in the annular space and the result is that the cell, which is mounted at one end will tend to pull apart axially. This has been found to be a serious problem. An object of the invention is to overcome and solve this problem by way of the cell construction as just described and to provide a simple but effective way of sealing the ends of the modules.

BRIEF DESCRIPTION OF THE DRAWINGS

Further objects and additional advantages of the invention will become apparent from the following description and annexed drawings wherein:

FIG. 1 is a cross sectional view of return bend sections of tubing connected to a header for continuous series flow;

FIG. 2 is an exploded perspective view of one of the desalination cells of the invention;

FIG. 3 is a cross sectional view of a single desalination cell of the invention with the membrane in place within a feed tube section;

FIG. 4 is a detail view of a male end core fitting;

FIG. 5 is a detail view, partly in section, of a female end core fitting;

FIG. 6 is a cross sectional view taken along the line 6—6 of FIG. 5;

FIG. 7 is a detail sectional view of an end part of a core showing the seal provided by the membrane; and FIG. 8 is a partial perspective view of the tube assembly of a reverse osmosis machine embodying the invention.

DESCRIPTION OF THE PREFERRED EMBODIMENT

FIG. 1 of the drawings is a sectional view of a part of the reverse osmosis machine as shown in FIG. 8 showing a part of the tube sheet and header. The tube sheet is designated at 10 having secured in it the ends of the tubes 12 and 14 which are sections of similar U-tubes 16 and 16'. Numeral 17 designates a metal header casting which connects tube sections 12 and 14. Header 17 has mounting lugs which can be attached to the tube sheet 10 by suitable means. It has two integral, cylindrical parts as indicated at 24 and 26 which have extending bosses or nipples 28 and 30 having bores 32 and 34 and counterbores 31 and 33 as may be seen in FIG. 1. These bores receive cylindrical parts of plastic fittings forming part of the desalination cells as will be described more particularly presently. Within parts 24 and 26 are bores 19 and 21 connected by passageway or port 23. Bores 19 and 21 are beveled at their ends as shown and sealed to tube sheet 10 by O-rings 25 and 27.

The headers like 17 connect U-tubes like 16 in successive tiers at different levels as may be seen in FIG. 8 which will be described more in detail presently.

Numeral 18 designates an inlet header casting and 18' designates a similar casting which is an outlet header. Inlet header 18 is shown in detail in FIG. 3. It has a bore 29, counterbore 35, and counterbore 37. Bore 29 is beveled at its end and sealed to tube sheet 10 by O-ring 25. Header 18 has mounting lugs for attaching like casting 17.

Within tube 12 of U section 16 is shown a cylindrical desalination cell 36 having plastic end fitting 38 which will be described more in detail presently.

The desalination cell is shown in perspective in FIG. 2 and in cross section in FIG. 3. The fitting 38 has a configuration as shown in FIGS. 2 and 3. As may be observed, it has a cylindrical part 46 which has equally angularly spaced ribs 48, the outside surfaces of which have a taper as shown at 50. The end part of each rib is cut away forming a square shoulder as shown at 52. Numeral 54 designates one of a pair of circumferential bayonet slots near the end of fitting 38. Axial slot 56 is one of a pair communicating with the circumferential slots. The end part of the rib 48 has a radial slot as shown at 60.

At the left end of fitting 38 there are portions of progressively smaller diameter as designated at 62, 64, and 66. FIGS. 1 and 3 illustrate the manner in which the fitting 38 fits into casting 18. The end part 62 of fitting 38 is in counterbore 35 and abuts against an O-ring 70. Part 64 fits into bore 37. Part 66 extends exteriorly of casting 18. Fitting 38 has a cylindrical bore 72. Its right end extends through tube sheet 10.

FIG. 1 shows core fitting 38' similarly assembled in header casting 17 against O-ring 70'.

Desalination cell 36 is formed in modular sections as may be seen in FIGS. 2 and 3. One of the sections comprises a cylindrical porous core member which may be made of ceramic as designated at 76. The porous member has a bore 78. Numeral 76' designates another similar module section. Section 76 has threaded end counterbores as designated at 80 and 82. Numeral 86 designates a male plastic core fitting which is shown in detail in FIG. 4.

Fitting 38 in addition to the bore 72 has a first counterbore 90 and a second counterbore 92. The male core fitting couples the porous section 76 to end fitting 38.

Male core fitting 86 has a bore 96 of the same size as bores 72 and 78. It has an intermediate cylindrical part 100 having a diameter to fit into the counterbore 92. It has an extending end part 102 of a diameter to fit into counterbore 90. It has an intermediate part 104 of a larger diameter, this diameter being the same as the outside diameter of core member 76. Core fitting 86 has extending threaded end part 106 which is of a size to thread into threaded bore 80 in the end of core member 76. The male core fitting 86 has extending projections or knobs 107 and 108.

FIG. 3 shows the assembly between the core member 76 and male core fitting 86 and end fitting 38. Threaded end 106 of core fitting 86 is threaded into threaded counterbore 80 in the end of core member 76 with part 104 abutting against the end of the core member. The male core member 86 is joined to the end fitting 38, the extending projections 107 and 108 having been received into the axial slots 56 and 56' in the end of fitting 38 after which these projections are rotated into the circumferential slots 54 and 54' in fitting 38, thus, forming a bayonet joint or lock between these parts. Part 100 fits against O-ring 101 in bore 92.

Numeral 120 designates a female core fitting at the other end of core member 76. It is shown in detail in FIG. 5. It is cylindrical, having an outside diameter the same as the outside diameter of the core member 76. It has an extended threaded part 122 of a size to thread into the threaded counterbore 82 in the end of core member 76. It has a bore 124 of the same size as bores 72, 78, and 96. It has a first counterbore 126 and a second counterbore 128. It has axial slots 130 and 130' and circumferential slots 132 and 132' adapted to form part of a bayonet joint or coupling. Numeral 86' designates a second male core fitting which in FIG. 3 is assembled to the female core fitting 120 in the manner already described in connection with fitting 38. Between part 100' of core fitting 86' and the bottom of counterbore 128 is provided a sealing O-ring 136.

Numeral 76' designates another modular core section to the right end of which is joined another female core fitting 120' which is like the core fitting 120. Numeral 140 designates an end plug which may be made of plastic and which serves to close the end of the desalination cell. It has a cylindrical body 142 of a diameter to fit into the counterbore 128' in core fitting 120'. The body has an end flange 144 as shown. At the other end is a tapered extension or plug 146 adapted to extend into bore 78' in core member 120' to close it. End member 140 does not have extending projections adapted to be received in axial slots 130a and 130a' in core fitting 120' and to be turned into the circumferential slots 132a and 132a', although it could have. Pressure in the U-tube holds end plug 140 in position.

Numeral 158 designates the membrane which is on the exterior of the core of the desalination cell. Typically, the membrane consists of an outer skin and a jelly-like substructure which is between the skin and the outer surface of the core, as illustrated in FIG. 7. The membrane may be of various types, for example, it may be of a type referred to in U.S. Pat. No. 3,400,825 or of other types known in the art. The problem which has been encountered in this type of construction in the past has been of sealing the membrane to the pressure vessel which surrounds or encloses the desalination cell. In the construction shown and as illustrated in FIG. 7, porous core member 76 is closed by male core fitting 86 which has the threaded part 106 threaded into threaded bore 80. This seals the end of the bore and also provides axial strength and rigidity. It is possible to adhesively attach the core fitting, but the structure shown is preferred. As may be seen in FIG. 7, membrane 158, which is applied to and on the desalination cell, bridges the joint between core fitting 86 and the end of core member 76. Membrane 158 is terminated at part 100 of core fitting 86 as shown in FIG. 7. Also, preferably, the material of core fitting 86 is selected so that is unites chemically with membrane material 158 to form an alloy of the two materials so as to positively insure a perfect seal. The membrane material may be cellulose acetate composition as shown in the art and the core fitting material may be a polycarbonate plastic, by way of example.

The direction of flow, that is the feed fluid and permeate in FIG. 3, is indicated by the arrows.

As explained, there are a plurality of U-tubes like the tubes 16 connected to headers 17 mounted from tube sheet 10 with a desalination cell in each tube section with a continuous series flow of feed fluid through the tubes as illustrated in FIGS. 3 and 8.

The end parts 66 of fittings 38 which extend from the headers connect to a permeate manifold 170 as may be seen in FIG. 8. Manifold 170 has four series of equally angularly spaced nipples as indicated at 172, these series of nipples being connected to the end parts or nipples 66 of the desalination cells. The purified water is drawn off through this manifold. The feed of water to be purified or desalinized connects to the inlet header 18 as designated by the arrow. Feed is admitted as shown by the arrow at header 18 and travels through two banks of tubes, each having an inlet header 18. The outlet is from outlet header 18' from the lower bank.

In FIG. 2, there is shown a slightly modified form of header as designated at 172. This header corresponds to header 17. This header has an intermediate tubular part 174 and end sections 176 and 176' having faces 177 and 177' which attach against tube sheet 10. These faces have cylindrical bosses 178 and 178' with extending tubular nipples 180 and 180' through which the end parts 66 and 66' of end fittings 38 extend. Numerals 182 and 182' designate holes for securing bolts insertable between webs 183, 184, 183' and 184'.

If desired, headers like 17 and 18 can be fabricated as an integral header unit rather than being two separate parts.

From the foregoing, those skilled in the art will fully understand the nature and construction of the invention, its operation, and the manner in which it acheives and realizes the objects and advantages set forth in the foregoing.

The foregoing disclosure is representative of a preferred form of the invention and is to be interpreted in an illustrative rather than a limiting sense, the invention to be accorded the full scope of the claims appended hereto.

What is claimed is:

1. A filter element comprising;
a porous core member having a cylindrical exterior surface and a bore therethrough having a cylindrical surface; a connector fitting of material other than that of said core member secured to an end thereof and having inner and outer cylindrical surfaces constituting axial continuations of said exterior surface and the surface of said bore; and a permeable membrane covering one of said surfaces of said core member, extending across the joint between said core member and fitting and being sealingly secured to said fitting.

2. A filter element as in claim 1, wherein said membrane is on the outside of said core member and bridges the outside of the joint between the core and said fitting.

3. A filter element as in claim 2, wherein the membrane material and the fitting material are constructed of materials such that they unite chemically to form an alloy of the two materials.

4. A filter element as in claim 1, wherein said fitting has threaded engagement with the core member.

5. A filter element as defined in claim 1 wherein said fitting is configured to constitute the one part of a coupling having male and female parts, said core member having a fitting at the opposite end configured to constitute one part of a coupling having male and female parts, said male and female parts being constructed to provide a bayonet joint for holding them together against axial pressure and in sealing relationship, whereby a plurality of core members and fittings can be assembled into a continuous elongated unit.

6. A system embodying a plurality of relatively short porous members each having an exterior cylindrical surface and having an axial bore presenting a cylindrical surface; a semipermeable membrane covering one of said surfaces; a plurality of fittings of material other than that of the core members secured to the ends of core members; and means whereby the ends of fittings are securable together to form separable sealed joints, whereby a relatively long assembly can be formed of relatively short porous core members and fittings detachably secured together in axial alignment, said semipermeable membrane bridging the joints between the ends of core members and their corresponding fittings and being sealingly secured to said fittings.

* * * * *